J. JOHNSON.
FILTER PRESS.
APPLICATION FILED FEB. 9, 1912.
1,139,767.
Patented May 18, 1915.
5 SHEETS—SHEET 5.
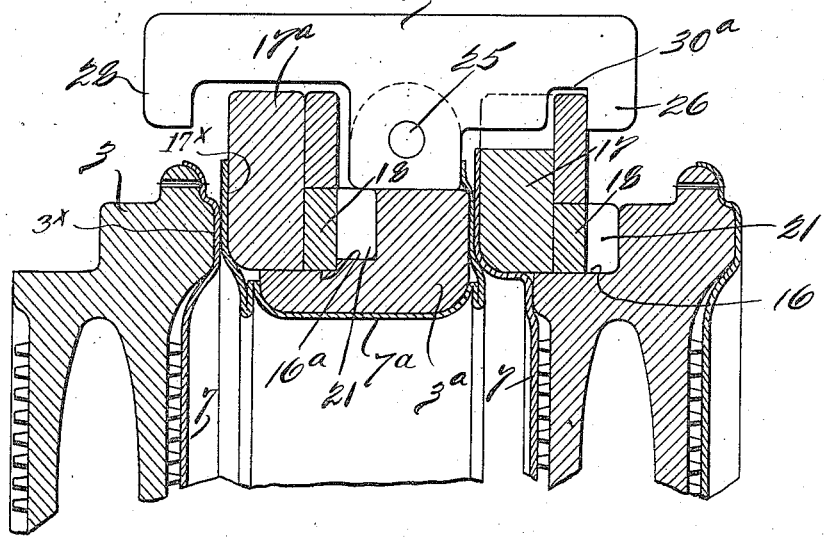
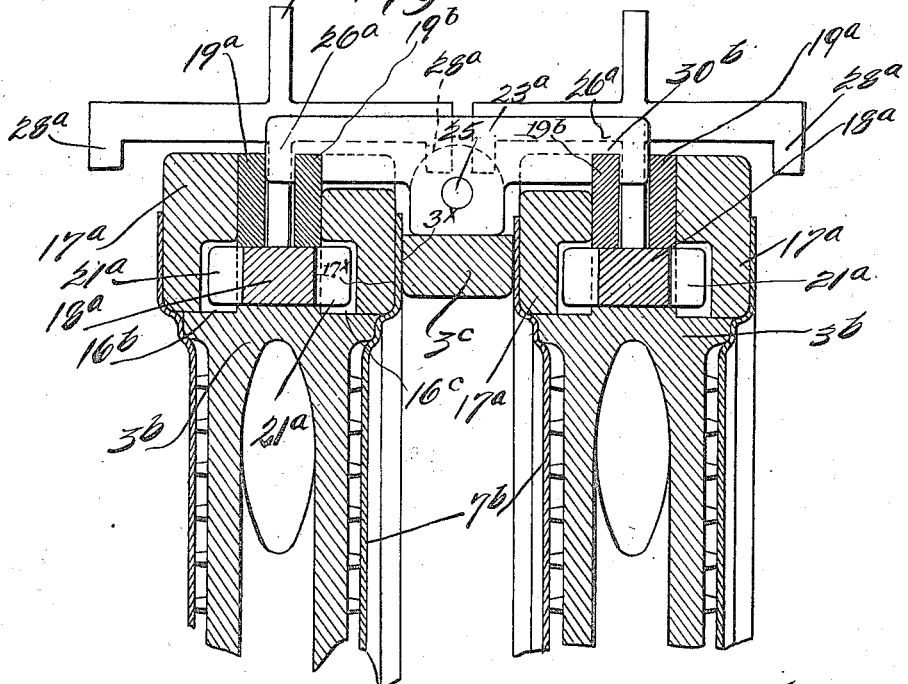
Witnesses:
C. A. Jarvis
A. Bernstein
Inventor:
John Johnson
by W. Albert et al
Attorneys.

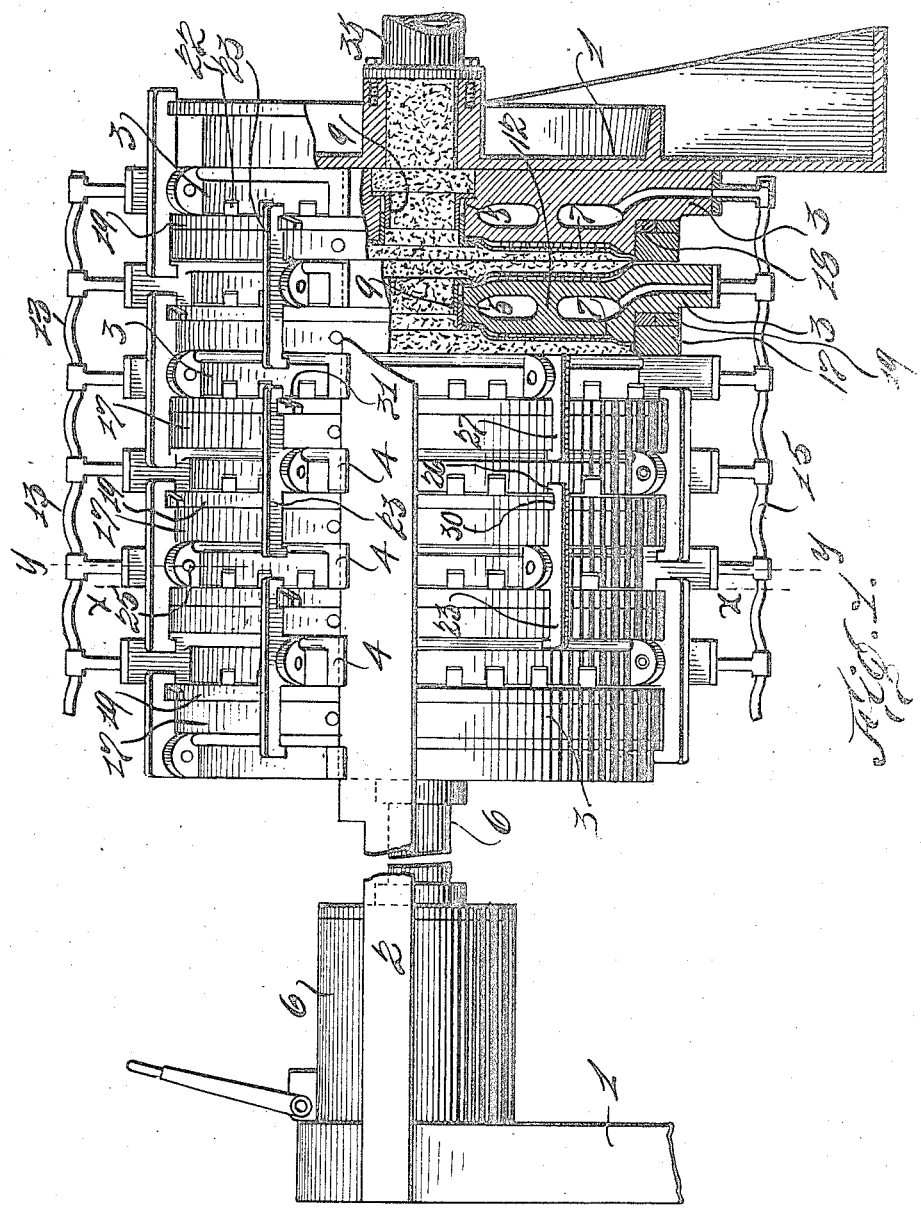

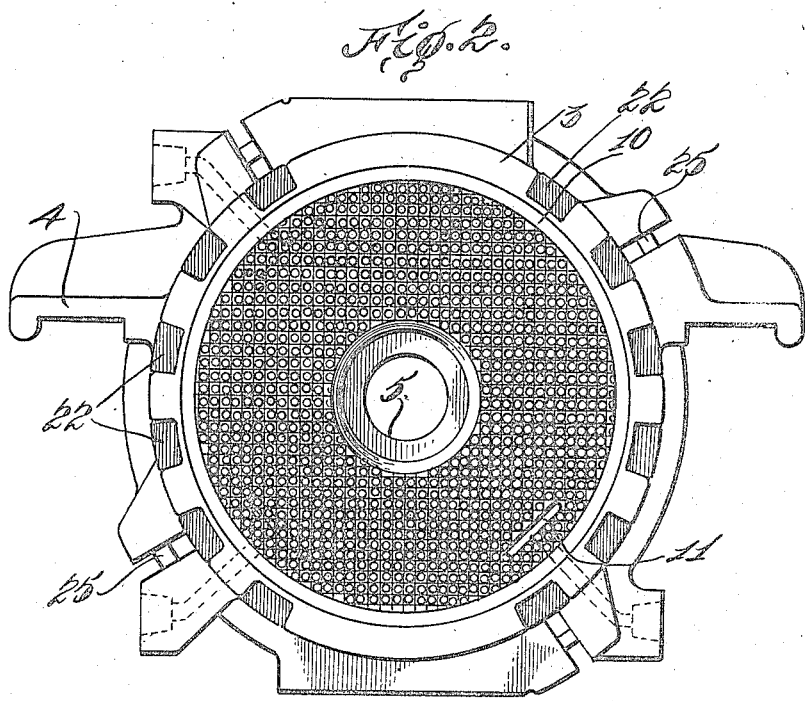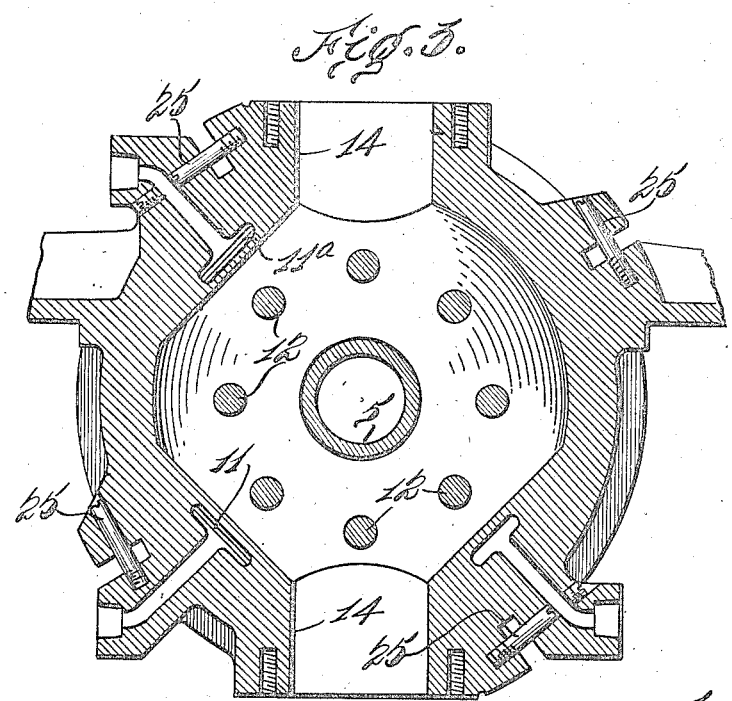

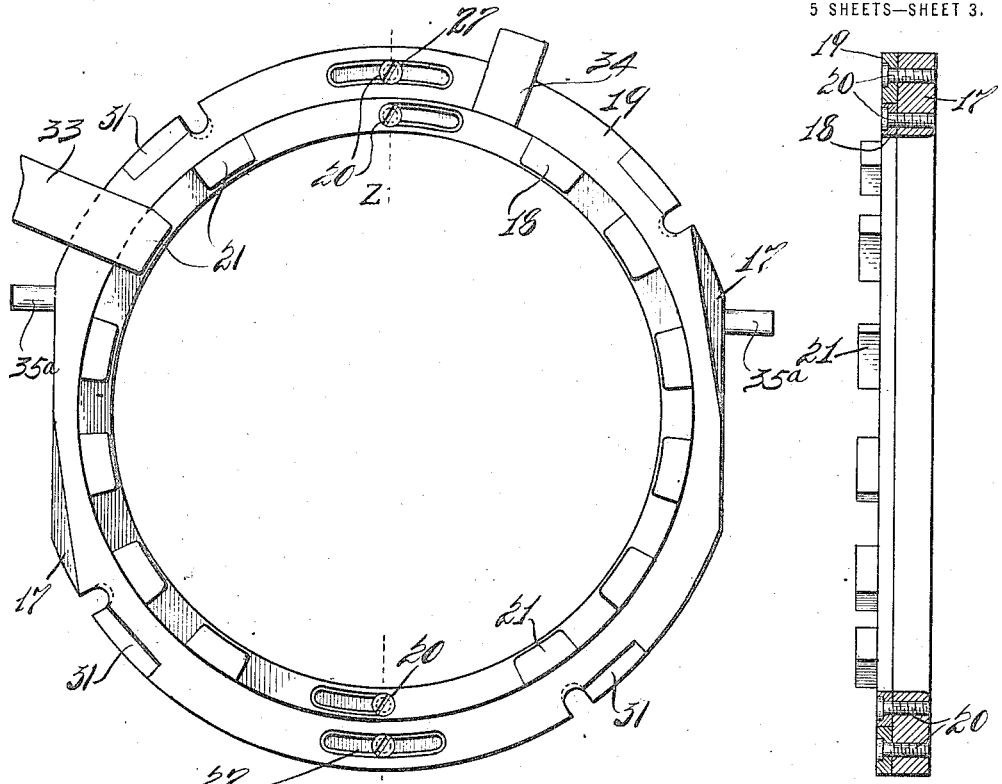
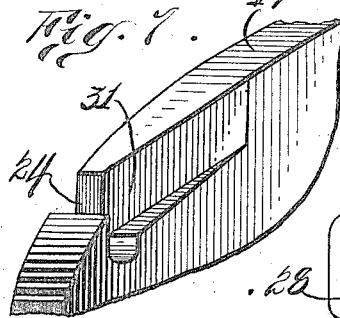
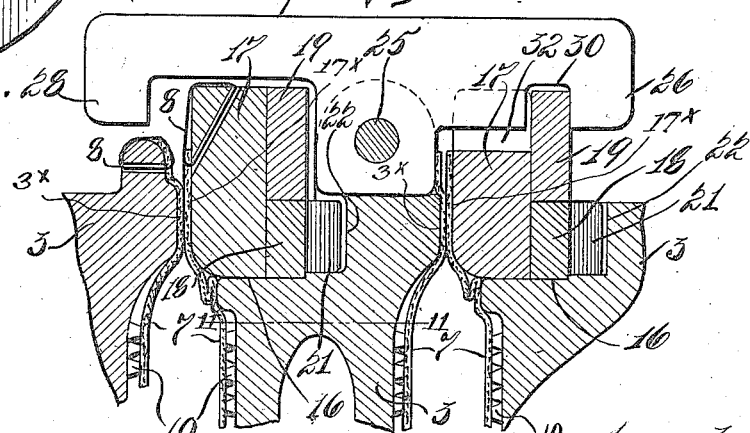

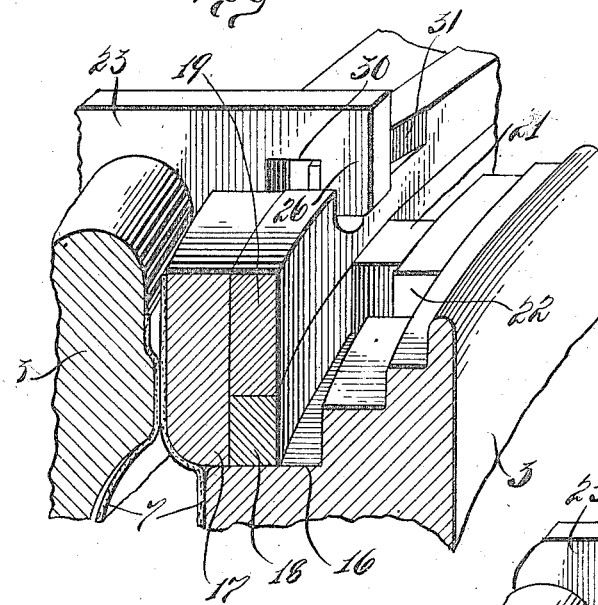
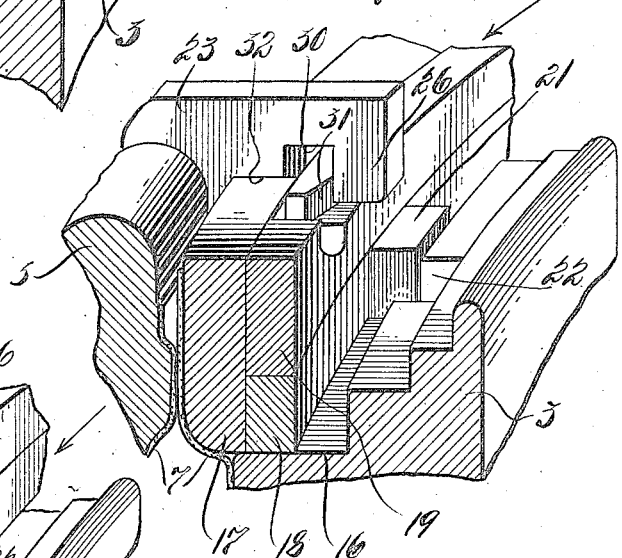
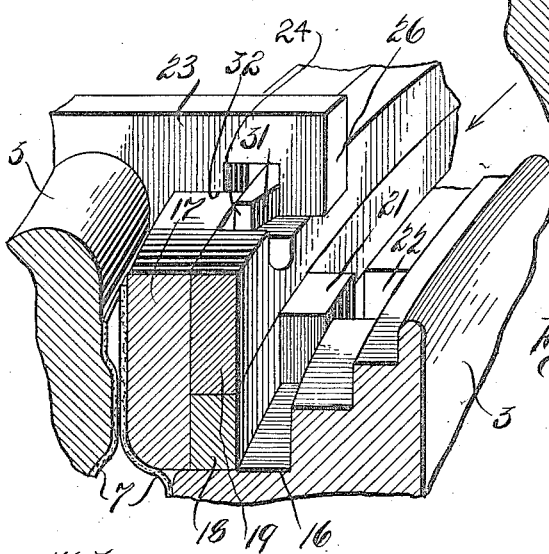

UNITED STATES PATENT OFFICE.

JOHN JOHNSON, OF BROOKLYN, NEW YORK.

FILTER-PRESS.

1,139,767.  Specification of Letters Patent.  Patented May 18, 1915.

Application filed February 9, 1912. Serial No. 676,478.

*To all whom it may concern:*

Be it known that I, JOHN JOHNSON, a citizen of the United States, residing at Brooklyn, New York, have invented certain new and useful Improvements in Filter-Presses, of which the following is a clear, full, and exact description.

This invention relates to a force filter press of the collapsible type, and has for its object the improvement in the construction of the same to promote efficiency and economy in operation.

The press as herein shown may consist of one or more filtering compartments and is designed to be used like the ordinary press in which the substance to be filtered is pumped or forced into the interior of said compartments so as to drive the filtrate through a lining of filtering material such as cloth.

It is further designed to permit of the walls of the filtering compartments being collapsed upon one another under mechanical power so as to still further compress the residue and drive through more filtrate.

The chief difficulty heretofore with presses of this character has been in preventing the material from oozing out or escaping through the moving joints of the press during the collapsing movement of the compartment walls, and in my present improvement I provide against this objection by a novel arrangement of moving joints which enables them to be covered and protected with filtering cloth, whereby nothing but the filtrate can escape through said joints.

My arrangement may be varied by many different forms of constructions all utilizing the same principle, and I have shown in the drawings and shall describe hereinafter in the specification several modifications of such an arrangement.

My invention will be defined in the claims.

In the embodiment shown in the drawings, which is my preferred construction, Figure 1 is a side elevation of the filter press having a portion broken away in section; Fig. 2 is a section through X—X of Fig. 1 showing a front elevation of a single filter plate; Fig. 3 is a section through a filter plate taken along Y—Y of Fig. 1; Fig. 4 is a front elevation of the packing ring having the locking ring and separating ring attached thereto; Fig. 5 is a section along Z—Z of Fig. 4; Fig. 6 is a fragmentary section of several filter plates showing the means of locking the packing ring with the filter plate yoke; Fig. 7 is a perspective view of a portion of the cam of the locking ring; Figs. 8, 9 and 10 are perspective views showing the locking and separating rings in different positions of their operation; and Figs. 11 and 12 are fragmentary sections similar to Fig. 6 showing other modified forms of collapsible closure mechanism.

The main supporting frame of my filter press is indicated at 1 having the usual side runs 2 for supporting the several filter plates 3. These filter plates 3 are preferably circular in form as shown in Fig. 2 and may be provided with suitable arms 4 for resting on said runs 2. The opposite sides of said filter plates may be slightly concave, as shown, to form filtering compartments, when the same are adjacently supported and held together. Said plates are also preferably apertured at their centers 5, to afford communication between the several compartments so formed, and thus make up the entire filtering tank. An inlet pipe 35 is shown at one end of said frame communicating with the central apertures of the filtering compartments, for introducing thereto under pressure the material or liquid to be filtered. The means for forcing this liquid into the filter press is not shown in the present embodiment, but it is understood that any convenient means may be used for this purpose. Also any suitable means for creating pressure, such as a hydraulic ram or pressure means 6 conventionally illustrated at the left of Fig. 1, may be employed at the other end of a series of filter plates for forcing them together.

Secured to the face of each filter plate is a lining of suitable filtering material, such as cloth 7. This cloth may be suitably attached to the plate by binding thread 8 inserted through apertures formed for the same in plate 3 as disclosed more particularly in Fig. 6. The edges of the filtering cloth surrounding the central apertures of said plates are tightly clamped to said plates, preferably by means of bushings 9. These bushings may be in two parts as shown in Fig. 1 and screw-threaded to engage each other and clamp the filter cloth tightly to the plate. The face of each filter plate beneath the cloth is corrugated or channeled in the usual way as shown at 10 in Fig. 2 to permit the liquid filtered through said cloth to run down and escape through outlets 11 formed at the lower portion of said plates.

I prefer to construct filter plates substantially hollow in cross section, leaving cores 12 in said hollow portion to prevent the walls from collapsing under the tremendous pressure to which said plates are subjected. Flexible pipes 13 and 15 communicate with the interior of said plates by conduits 14 and serve to introduce a heating medium, such as steam, hot air or water into said plates. The steam may be led into said interior by the upper pipes 13, while the lower pipes 15 may serve as a drain or outlet. By thus distributing heat throughout each filter plate I am able to secure much better and quicker results in expelling moisture from the residue contained in said filtering compartment.

I will now describe the collapsible joint-structure acting as a closure for the peripheral opening between the filter plates of each compartment and the means for sealing said opening against egress of liquid except through said filter cloth. This mechanism may be designed in various forms all employing the same general principle, and in Figs. 6, 11 and 12 I have shown three of such forms.

Referring to Figs. 4–10, which show my preferred arrangement, the collapsible joint-structure consists of a packing member or ring 17 slidably mounted upon a carrying shoulder 16, which may be formed as shown adjacent the periphery of each filter plate 3. The front of the packing member is adapted to abut against an opposed face portion of the coöperating filter plate 3, as shown in Figs. 6–10, and together form what I term "joint surfaces" $17^x$, $3^x$, for the filtering compartment. The filter lining or cloth 7 of the compartment is preferably extended between these abutting face portions or joint surfaces as shown. Behind each packing member 17 and preferably carried thereby is a variable spacing member or ring 18 having a pin and slot connection with said packing member for being slidably mounted thereon as shown in Fig. 4. In the present embodiment the variable spacing member 18 is formed with teeth 21 adapted to coöperate with notches 22 at the rear of shoulder 16 for variably spacing the packing member 17 therefrom. Obviously the slidable movement of the spacing ring 18 enables its teeth 21 to be brought into and out of register with the notches 22, so that the coöperating filter plates may be brought together a greater or less distance. It is understood that previous to the collapsing of a filter press of this character material to be filtered is first pumped or forced into the same under great pressure for driving through as much filtrate as possible, after which the collapsible mechanism should be adjusted to permit forcing plates nearer together under mechanical power. During the shifting of the spacing member 18 for this purpose the joint surfaces $17^x$ and $3^x$ should be securely locked together to prevent the egress of unfiltered material therebewteen. Any suitable locking means or clamp may be employed for this purpose, and in the present embodiment I have provided a locking member or ring 19 slidably mounted upon the rear side of the packing member 17 by pin and slot connections 27. As shown, the locking member 19 rides upon the upper side of the spacing member 18 and said locking member is provided with one or more cam surfaces 31 adapted to coöperate with overhanging arms 26 carried upon the opposed face portion 3 against which the packing member 17 is to be locked. It is also desirable to retain each associated packing member, spacing member and locking member upon their carrying shoulder within a limited range of sliding movement, and in the embodiment shown in Fig. 6 I have mounted upon the periphery of each filter plate 3 in bosses 25 (see Fig. 1) one or more yokes 23, one arm 26 of which overhangs an adjacent locking ring 19 and embraces the same within a downwardly facing notch 30, and the other arm 28 of which overhangs and is normally spaced from the front of its retained packing member 17. The right arm 26 of the yoke extends through a slot 32 of the adjacent packing member to the right, observing Fig. 6, and the locking member 19 is also slotted at 24 (see Fig. 7) adjacent the end of the cam surface 31 to permit the right-hand locking arm 26 of each yoke to be entirely withdrawn from the adjacent right-hand packing mechanism 17, 19 when it is desired to open out widely or dismantle the entire press.

Handles 33 and 34 are fixed to the variable spacing member 18 and locking members 19 respectively for sliding the same into different positions, and the packing member 17 is provided with supporting pins $35^a$ as shown, riding upon side runs 2.

Fig. 11 shows in partial section a modified form of the collapsible joint-structure which acts as a closure for the peripheral opening of the filtering compartment formed between two filtering plates 3. This construction allows two separate collapsing operations to take place between two opposed filter plates 3, since the mechanism separating said plates is provided with duplicate collapsible devices such as shown and previously described in regard to Fig. 6. To more readily understand the construction of Fig. 11 we may assume that in the construction shown in Fig. 6 the central filtering plate 3 has been removed by cutting the same out along the line 11—11 as shown in Fig. 6, leaving merely a separating ring 3ª which is covered with a filtering cloth 7ª and is formed to carry upon its shoulder 16ª collapsible and packing devices of the same character as carried upon the shoulder 16 of the plates 3. A filtering compartment built according to the design shown in Fig. 11 allows the walls 3 to approach or be collapsed toward each other twice the distance permitted by the construction of Fig. 6.

Another design of filtering compartment for permitting a double collapsing operation between the walls of each compartment is shown in Fig. 12. In this modification each filtering plate 3ᵇ has formed upon its periphery duplicate carrying shoulders 16ᵇ and 16ᶜ, one at each side. Upon each of these carrying shoulders is a full set of packing and collapsible devices such as are carried upon the shoulder 16 of the plates 3, comprising a packing member 17ª and locking member 19ª and a variable spacing member 18ª. Between the opposed faces of the packing members 17ª may be located, if desired, a distance ring 3ᶜ, upon which may be carried the yokes 23ª, which in this case are formed at each side with locking arms 26ª, which coöperate with the cam rings 19ᵇ formed similar to 19 for locking the packing members 17ª against the interposed distance ring 3ᶜ. The variable spacing member 18ª as shown in this modification is provided with teeth 21ª upon both of its lateral edges which are adapted to coöperate with notches formed upon the rear sides of the packing members 17ª. Also upon this variable spacing device 18ª are carried the retaining arms 28ª extending both right and left for retaining each set of packing devices upon its associated carrying shoulder 16ᵇ.

33ª indicates the handle for moving the variable spacing member 18ª. As shown, the filter lining 7 of the compartment formed between two filter plates 3ᵇ, is extended upwardly between the joint surfaces 17ˣ and 3ˣ of the packing members 17ª and the distance ring 3ᶜ. It is obvious of course that the distance ring 3ᶜ may be omitted entirely if desired, and the opposed packing members 17ª be made to abut each other upon the interposed filter lining 7.

The operation of my filter press will now be described with regard to the form of collapsing joint-structure shown in Figs. 4 to 10, inclusive. Referring to Fig. 1, the filter plates 3 are closed tightly upon each other to form the usual filtering compartments, by any suitable mechanical pressure device, as the hydraulic ram 6 shown. It is understood that in this first operation the teeth 21 of the variable spacing member 18 are out of register with notches 22 upon the shoulder 16 as shown in Fig. 8. The material to be filtered may then be pumped through the inlet 35 into the interior of the compartments under great pressure to force as much filtrate through the filtering cloth as possible. When this limit is reached and no more filtrate can be forced through from the pumping pressure through inlet 35, the communication with a pump is cut off by any suitable valve (not shown) and the locking members 19 are operated by handles 34 to securely lock each packing member 17 against the opposed filter-plate to tightly close the joint surfaces 17ˣ and 3ˣ. This operation is clearly disclosed in Fig. 9 in which the locking member or ring 19 is moved so that its cam face 31 coöperates with the overhanging arm 26. When the packing members are locked to their opposed filter-plates, the pressure from the hydraulic ram 6 is released sufficient to move the variable spacing member or ring 21 around its shoulder 16 so as to register the teeth 21 with the notches 22, as shown in Fig. 10.

The purpose of locking the packing members 17 against the opposed filter-plates 3 will now become apparent, for if they were not so locked the pressure of the substance contained within each filtering compartment would tend to separate the joint surfaces 17ˣ and 3ˣ thereof and allow the escape of material between edges of the filtering cloth. It is also obvious that any locking or clamping means other than that shown may be employed for locking the packing member 17 against its opposed filter-plate 3 during this operation.

The teeth 21 of the spacing device being now in register with the notches 22 as shown in Fig. 10, the power is again applied from the ram 6 to force the filter plates 3 closer together and mechanically force more filtrate through the cloth 7. It is obvious that during this collapsing operation no substance within the filtering compartment can escape through the moving joints of the above mentioned collapsing devices since they are all securely covered with the filtering cloth 7, while the abutting or fixed joint between the surface 17ˣ of packing member 17 and the surface 3ˣ of the opposed filter-plate 3 into which the filter cloth extends, is firmly sealed against egress by the locking members. After this collapsing operation the press is extended by carrying the leftmost filtering plate to the left as shown in Fig. 1, whereby its yoke arms 26 withdraw the packing and spacing devices from the notches 22, separating the walls of each compartment successively. If it is desired to dismantle the entire apparatus, the notches 24 are brought into alinement with the yoke arms 26 so that these arms may pass therethrough and allow their associated filter plate to be entirely separated from the opposed filter plate to the right.

In view of the foregoing description it is not considered necessary to particularly describe the operation of the modifications shown in Figs. 11 and 12, since they would operate in substantially the same manner in accordance with their analogous construction.

What I claim is:

1. In a force filter-press in combination, a compartment formed of separable side walls, collapsible joint-structure for closing the peripheral opening between said side walls, comprising a packing member, a carrying shoulder upon which said member is slidably mounted, an abutting face portion opposed to said packing member, means for locking the front of said packing member against said face portion, and a spacing device therefor separable from said side walls mounted upon said carrying shoulder at the rear of said packing member.

2. In a force filter press in combination, a compartment formed of separable side walls, collapsible joint-structure for closing the peripheral opening between said side walls, comprising a packing member, a carrying shoulder upon which said member is slidably mounted, an abutting face portion opposed to said packing member, means for locking the front of said packing member against said face portion, a spacing device mounted upon said carrying shoulder at the rear of said packing member, and retaining means for holding said packing member, locking means, and spacing device upon said carrying shoulder.

3. A force filter press comprising in combination a collapsible tank of one or more compartments, each formed of separable side walls substantially lined with filtering material, collapsible joint-structure for closing the peripheral openings between the coöperating side walls, comprising one or more packing members and corresponding carrying shoulders upon which said packing members are slidably mounted, an abutting face portion opposed to each packing member with the filter lining of the corresponding compartment extending therebetween, cam means for locking the front of each packing member against said opposed face portion upon the interposed filter lining for sealing the joint, a spacing device mounted upon said carrying shoulder at the rear of each packing member, and retaining means for holding each associated packing member, cam means, and spacing device upon its corresponding carrying shoulder.

4. A force filter press comprising in combination, a collapsible tank of one or more compartments, each formed of separable opposed filter plates substantially lined with filtering material, and having an inlet through their centering for substance to be filtered, collapsible joint-structure for closing the peripheral openings between said coöperating filter plates, comprising a packing ring, a carrying shoulder formed adjacent the periphery of said plates upon which said packing ring is slidably mounted, an abutting face portion formed upon the opposed plate, the filter lining of said compartment extending between said abutting face portion and packing ring, a cam ring behind said packing ring for locking its front against said opposed face portion upon the interposed filter lining for sealing the joint, a toothed spacing ring located behind said packing ring and coöperating with notches in said carrying shoulder for varying the space between said opposed filter plates, and retaining means for holding said associated packing ring, cam ring, and spacing ring upon said carrying shoulder.

5. In a force filter-press in combination, a compartment formed of separable side walls, a collapsible joint-structure for closing the peripheral opening between said walls, comprising a toothed spacing device and an opposed portion having notches coöperating therewith.

6. In a force filter-press in combination, a compartment formed of separable side walls, a collapsible joint-structure for closing the peripheral opening between said walls, comprising a packing member, an opposed portion having an abutting joint surface, cam means for locking said packing member against said joint surface comprising a cam-carrier slidably mounted adjacent said packing member.

7. In a force filter-press in combination, a compartment formed of separable side walls, a collapsible joint-structure for closing the peripheral opening between said walls, comprising a packing member, an opposed portion having an abutting joint surface, cam means, for locking said packing member against said joint surface, comprising a cam-carrier slidably mounted adjacent said packing member, and cam coöperating elements carried by said opposed joint surface portion.

8. In a force filter-press in combination, one or more compartments each formed of side walls spaced apart, pressure means for forcing said side walls toward one another, a collapsible joint-structure for closing the peripheral opening between said side walls comprising abutting portions, means for locking the same together and spacing devices for said side walls and separable therefrom.

9. In a force filter-press in combination, one or more compartments each formed of side walls spaced apart, pressure means for forcing said side walls toward one another, a collapsible joint-structure for closing the peripheral opening between said side walls comprising abutting portions, means for locking the same together and spacing devices mounted adjacent said side walls and shiftable with relation thereto for holding said side walls apart against the force of said pressure means.

10. In a force filter-press in combination, one or more compartments each formed of side walls spaced apart, pressure means for forcing said side walls toward one another, a collapsible joint-structure for closing the peripheral opening between said side walls comprising abutting portions, means for locking the same together and adjustable spacing devices mounted adjacent said side walls for holding the same apart at different distances.

11. In a force filter-press in combination, one or more compartments each formed of side walls spaced apart, pressure means for forcing said side walls toward one another, a collapsible joint-structure for closing the peripheral opening between said side walls comprising abutting portions and sliding portions, a filter lining for said side walls covering said sliding portions and extending between the surfaces of said abutting portions, means for locking said abutting portions upon said filter linings, and spacing devices for said side walls separable therefrom.

12. In a force filter-press in combination, one or more compartments each formed of side walls spaced apart, a collapsible joint-structure for closing the peripheral openings between said side walls comprising abutting portions, pressure means for forcing said abutting portions together, means for locking said abutting portions together, said locking means being free from any pressure exerted by said pressure means when forcing said abutting portions together.

Signed at New York city, N. Y., this 12" day of January, 1912.

JOHN JOHNSON.

Witnesses:
 BEATRICE MIRVIS,
 ABRAM BERNSTEIN.